No. 875,866. PATENTED JAN. 7, 1908.
H. L. SULMAN.
PROCESS OF OBTAINING ZINC OXID FROM ZINC ORES.
APPLICATION FILED OCT. 30, 1906.
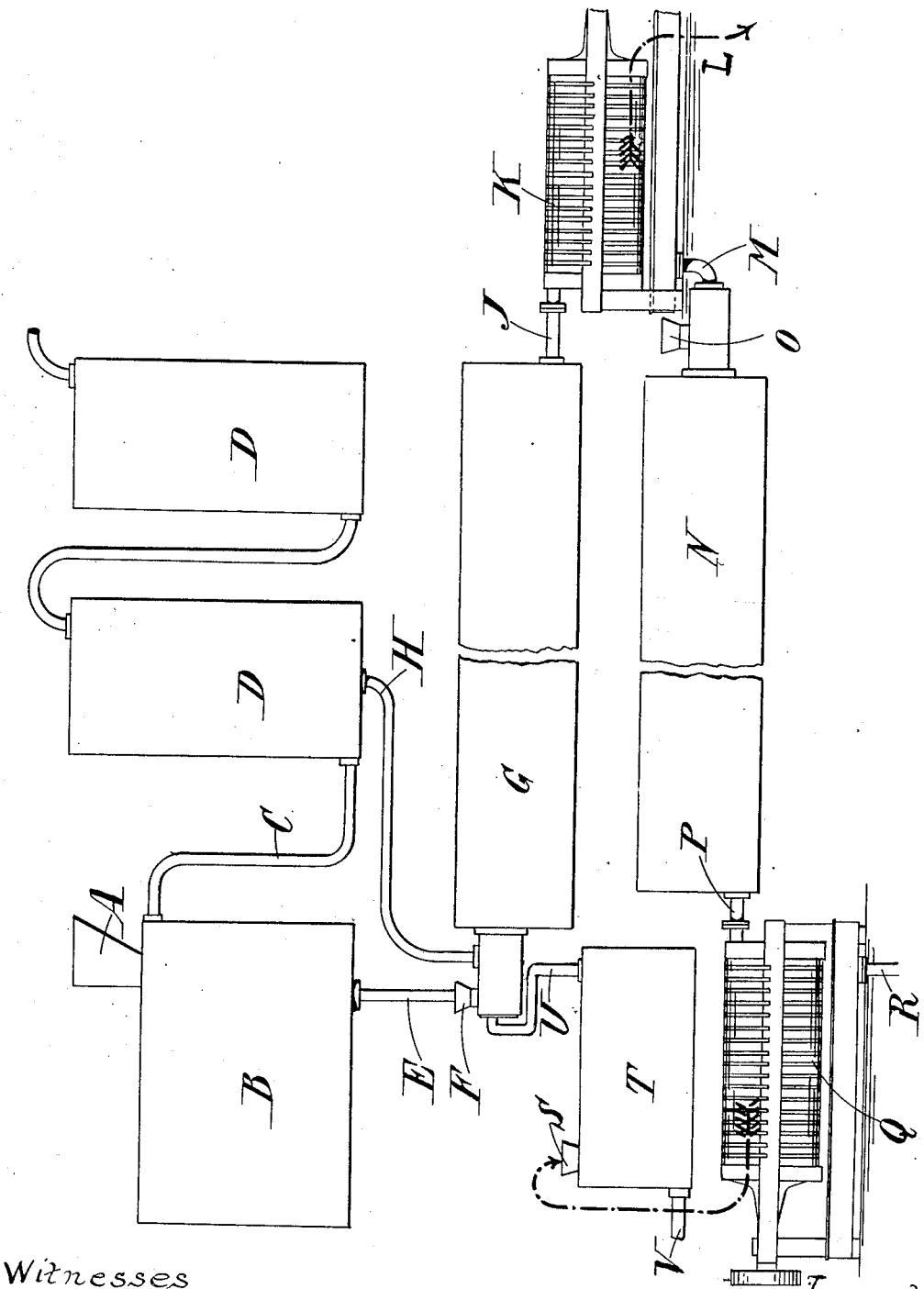

UNITED STATES PATENT OFFICE.

HENRY LIVINGSTONE SULMAN, OF LONDON, ENGLAND.

PROCESS OF OBTAINING ZINC OXID FROM ZINC ORES.

No. 875,866.     Specification of Letters Patent.     Patented Jan. 7, 1908.

Application filed October 30, 1906. Serial No. 341,350.

*To all whom it may concern:*

Be it known that I, HENRY LIVINGSTONE SULMAN, a subject of the King of England, residing in London, England, have invented certain new and useful Improvements in a Process of Obtaining Zinc Oxid from Zinc Ores, of which the following is a specification.

This invention has for its object to obtain zinc oxid from zinc ores, compounds and products. Such ores or products may contain other metals besides zinc, such as lead, copper, silver, gold, etc., which upon the separation of the zinc are left in a state suitable for recovery by other known methods, such as smelting, etc. Complex sulfid ores containing zinc, lead, silver, etc., the residues from the zinc distillation process, ferruginous zinc ores, and other ores or products of zinc are suitable for treatment by this method. The process belongs to the known type in which zinc ore roasted if necessary to produce zinc oxid is treated with sulfurous acid to dissolve the zinc oxid.

According to this invention, in the separation of zinc from its ores, the zinc is converted into oxid, the product is treated with a solution of sulfurous acid so as to obtain a solution of bisulfite of zinc and the zinc is precipitated as insoluble monosulfite by the addition of zinc oxid to the solution. For example, in treating a mixed ore containing zinc sulfid, the process consists in roasting the ore to convert the zinc into zinc oxid and yield sulfurous acid, treating the product with a solution of sulfurous acid so as to obtain a solution of bisulfite of zinc, precipitating the zinc as monosulfite by the addition of zinc oxid to the solution, calcining the monosulfite to yield zinc oxid and sulfurous acid which is used repeatedly.

The process depends firstly upon obtaining the zinc in solution as bisulfite by means of sulfurous acid which may conveniently be derived from the calcination of sulfid ores in suitable furnaces. If the ore in which the zinc is contained be a sulfid ore, or if the zinc exists in the state of blende, the ore is subjected to a dead roast in order to obtain the zinc as oxid, the other metals present being also transformed into oxids, or in the case of lead mainly into sulfate. The roasted material is now treated with an excess of sulfurous acid in a suitable vessel in the presence of sufficient water to dissolve the bisulfite of zinc so produced. The vessel may be one through which furnace gases sufficiently rich in sulfurous acid may be passed, and means for gentle attrition of the ore with the sulfurous acid solution, or for suitable stirring, may be provided in order to facilitate the dissolution of the zinc oxid. The solution vessel would be connected with condensation towers or suitable plant for arresting and recovering any excess of sulfurous acid for further operations. If the raw material carry zinc in the shape of oxid, or of readily decomposed silicate, or in the metallic condition, such preliminary roasting is not required, but the product can be at once treated with sulfurous acid and water for the purpose of dissolving the zinc mainly as bisufite. Fragments of metallic zinc of sensible size tend to become covered with a layer of zinc sulfid and to be only partially attacked; but such would be recovered from the undissolved residue by a subsequent vanning operation.

If silver be present in the ore, a soluble chlorid, such as salt, should be added to keep the silver insoluble, as silver chlorid; and thus render it available for recovery by smelting the zinc-exhausted residue with lead in the ordinary way.

The zinc bisulfite solution is now filtered from the insoluble residue, upon any suitable filter surface, or in a filter-press, and the residue washed free from soluble zinc, the washings being added to the main solution. The residue is now treated for the extraction of the other values which it may contain according to known means which form no part of this invention; *i. e.*, if it contain a suitable quantity of lead it may be smelted by the usual processes, by which any silver and gold present in the residues will be recovered in the lead bullion obtained. Or if the dezincked material contain metallic lead, or other substances capable of separation in a water current, the product may be subjected to a vanning operation for the recovery of such metallic or mineral values; such a method would be applicable to the product derivable from the acid treatment of zinc distillation residues. If the filtrate contains soluble copper it is submitted to "cementation" with scrap iron for copper recovery. The zinc bisulfite solution is now treated or digested with its equivalent of oxid of zinc (derived from the final operation of this process) for the purpose of converting soluble bisulfite of zinc into a double quantity of insoluble monosulfite of zinc Zinc oxid is at first apparently quite without action on zinc bisulfite solution, owing to its immediately becoming covered with a film or incrustation of insoluble zinc monosulfite which thus protects it from further action; but, if the equivalents of zinc oxid and zinc bisulfite in the form of a pulp be submitted to attrition in suitable apparatus, such as a tube-mill or "grit-mill", that is to say, a cylinder or barrel rotatable on its axis and half filled with spherical stones or large marbles, or subjected to other similar light and continuous grinding, this film or crust of monosulfite is constantly broken up, and fresh surfaces of oxid exposed, with the resulting complete precipitation of the total zinc present in the form of monosulfite of zinc. It is found moreover that by such means the monosulfite of zinc suspended in the pulp issuing from the mill is in a more or less granular and crystalline form and is capable of ready filtration. This precipitation of bisulfite of zinc by zinc oxid takes place readily in the cold. The zinc monosufite is now filtered from the liquor which may be run to waste, the sulfite being collected, dried, and submitted to calcination whereby zinc oxid is produced which can then be dealt with for the manufacture of spelter in the ordinary way. A portion of this oxid of zinc is returned to the grit-mill for the precipitation of fresh bisulfite of zinc, so that a moiety of zinc oxid is always in use cyclically. The sulfurous acid resulting from this calcination is collected, in the condensing tower or by suitable arrangements used for dissolving the further zinc oxid from roasted ores, or for the solution of other forms of zinc as before described, so far as may be desirable or necessary.

This process is also suitable for dealing with the lead and zinc concentrates obtained by physical or mechanical separation processes, and for effecting a sharp separation of lead and silver, and of zinc, therefrom.

It is not necessary to carry the precipitation of zinc bisulfite to completeness by means of zinc oxid; the last few percentages of soluble bisulfite may, if desired, be thrown down by lime as the proportion of calcium sulfate resulting is too small to affect the main bulk of the final oxid product disadvantageously, if this material is to be subjected to spelter distillation. Or the last traces may also be precipitated by a soluble alkali in place of continued attrition with zinc oxid. Such final precipitation may be resorted to in the event of small quantities of sulfate of zinc being present in the solution.
It is to be understood that the details of the process may be varied without departing from this invention.

In the drawing there is illustrated diagrammatically an apparatus for carrying out the process.

In said drawings A is a hopper through which the ore is fed into the muffle furnace B. The sulfur dioxid is led through the pipe C to the condensing towers D. The roasted ore from the muffle furnace B is led through the conveyer E to a hopper F which feeds the ore into a rotatable tube mill G. The sulfurous acid solution from the condensing towers D is also led into the tube mill G through a conduit H. The contents of the tube mill G are continuously discharged through the outlet J on to a filter K. The solid residue in the filter is removed at L to be smelted or otherwise treated. The liquid filtrate from the filter K is led through the conduit M into the rotatable tube mill N and at the same time the zinc oxid is fed into the tube mill N through the hopper O. The contents of the tube mill N are continuously discharged through the outlet P to the filter Q. The liquid filtrate which generally consists simply of water is discharged through outlet R to waste. The solid residue consisting of zinc monosulfite is led from the filter Q into a hopper S which supplies the muffle furnace T in which the zinc monosulfite is split up into zinc oxid and sulfurous acid. The sulfurous acid is led through the conduit U into the tube mill G so that the sulfurous acid is used cyclically. The zinc oxid produced in the muffle furnace T is removed at V and one half of it is returned to the hopper O to be introduced into the tube mill N. In order that the whole process may be a continuously operating one the fur-aces should be continuously operating.

What I claim as my invention and desire to secure by Letters Patent is:

1. The herein described process for obtaining zinc oxid from zinc ores which consists in dissolving zinc oxid from the ore with sulfurous acid, adding to the solution of bisulfite thus obtained zinc oxid which will precipitate the zinc as monosulfite, and calcining the monosulfite to produce zinc oxid.

2. The herein described process for obtaining zinc oxid from zinc ores which consists in converting zinc into oxid, dissolving the zinc oxid from the ore with sulfurous acid, adding to the solution of bisulfite thus obtained zinc oxid which will precipitate the zinc as monosulfite, and calcining the monosulfite to produce zinc oxid.

3. The herein described process for obtaining zinc oxid from zinc ores which consists in dissolving zinc oxid from the ore with sulfurous acid, adding zinc oxid to the bisulfite solution thus obtained to precipitate the insoluble monosulfite of zinc, submitting the mixture to attrition to prevent incrustation of the zinc oxid by zinc monosulfite, and calcining the monosulfite to produce zinc oxid.

4. The herein described process for obtaining zinc oxid from zinc ores which consists in converting the zinc into oxid, treating the ore with sulfurous acid solution to dissolve the zinc as bisulfite, separating the bisulfite solution from the residue, adding to the solution zinc oxid which will remove sulfurous acid and precipitate the zinc as monosulfite, separating the zinc monosulfite from the liquor and drying and calcining the same to produce zinc oxid.

5. The herein described process for obtaining zinc oxid from zinc ores which consists in converting the zinc into oxid, treating the ore with sulfurous acid solution to dissolve the zinc as bisulfite, separating the bisulfite solution from the residue, adding to the solution zinc oxid which will remove sulfurous acid and precipitate the zinc as monosulfite, separating the zinc monosulfite from the liquor and drying and calcining the same to produce zinc oxid, and collecting the sulfurous acid evolved for repeated use.

6. The herein described process for obtaining zinc oxid from zinc ores which consists in roasting the ore to obtain the zinc as oxid, dissolving the zinc oxid from the ore with sulfurous acid, treating the resulting bisulfite solution with zinc oxid to convert the soluble bisulfite of zinc into insoluble monosulfite and calcining the monosulfite to produce zinc oxid.

7. The herein described process for obtaining zinc oxid from zinc ores which consists in roasting the ore to obtain the zinc as oxid, treating the roasted material with an excess of sulfurous acid in the presence of sufficient water to dissolve the bisulfite or zinc so produced, filtering the bisulfite solution from the residue, treating the solution with oxid of zinc to convert the soluble bisulfite of zinc into insoluble monosulfite by removal of sulfurous acid, filtering the zinc monosulfite from the liquor and drying and calcining the same to produce zinc oxid.

8. The herein described process for obtaining zinc oxid from zinc ores which consists in roasting the ore to obtain the zinc as oxid, treating the roasted material with an excess of sulfurous acid in the presence of sufficient water to dissolve the bisulfite of zinc so produced, filtering the bisulfite solution from the residue, treating the solution with oxid of zinc to convert the soluble bisulfite of zinc into insoluble monosulfite by removal of sulfurous acid, submitting the mixture to attrition to prevent incrustation of the zinc oxid by monosulfite, filtering the zinc monosulfite from the liquor, and drying and calcining the same to produce zinc oxid.

9. The herein described process for obtaining zinc oxid from zinc ores which consists in roasting the ore to obtain the zinc as oxid, treating the roasted material with an excess of sulfurous acid in the presence of sufficient water to dissolve the bisulfite of zinc so produced, filtering the bisulfite solution from the residue, treating the solution with oxid of zinc to convert the soluble bisulfite of zinc into insoluble monosulfite by removal of sulfurous acid, submitting the mixture to attrition to prevent incrustation of the zinc oxid by monosulfite, filtering the zinc monosulfite from the liquor, and drying and calcining the same to produce zinc oxid and collecting the sulfurous acid evolved for repeated use.

In testimony whereof I have signed my name to this specification in the presence of two subscribing witnesses.

HENRY LIVINGSTONE SULMAN.

Witnesses:
 H. D. JAMESON,
 F. L. RAND.